United States Patent

[11] 3,619,776

[72] Inventor Warren G. Kinninger
6 Cornflower, St. Louis, Mo. 63033
[21] Appl. No. 831,355
[22] Filed June 9, 1969
[45] Patented Nov. 9, 1971

[54] MULTIFUNCTION INSTRUMENT INCLUDING PLUG-IN MODULES HAVING AMPLIFIER RESPONSE CONTROL ELEMENTS
1 Claim, 12 Drawing Figs.
[52] U.S. Cl..................................................... 324/115,
324/123 R
[51] Int. Cl.....................................................G01r 15/08,
G01r 1/30
[50] Field of Search......................................... 324/115,
73, 156, 123

[56] References Cited
OTHER REFERENCES
Tektronix Advertisement; Electronics; Nov. 3, 1967; pg. 51

Primary Examiner—Rudolph V. Rolinec
Assistant Examiner—Ernest F. Karlsen
Attorney—Roger M. Hibbits ABSTRACT: The present invention relates to a multifunction instrument in which the measurement of such quantities as conductivity, oxygen uptake or evolution, temperature, pH and colorimetry is accomplished by utilizing an instrument, comprising a common unit and function modules which are removably mountable to said common unit wherein the common unit is provided primarily with those functional elements normally used in any laboratory instrument designed for measurement of quantities in the field of use contemplated by the invention and the function modules are provided primarily with those elements normally associated with the measurement of a specific quantity.

PATENTED NOV 9 1971 3,619,776
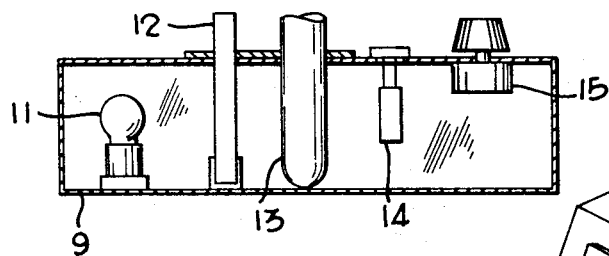
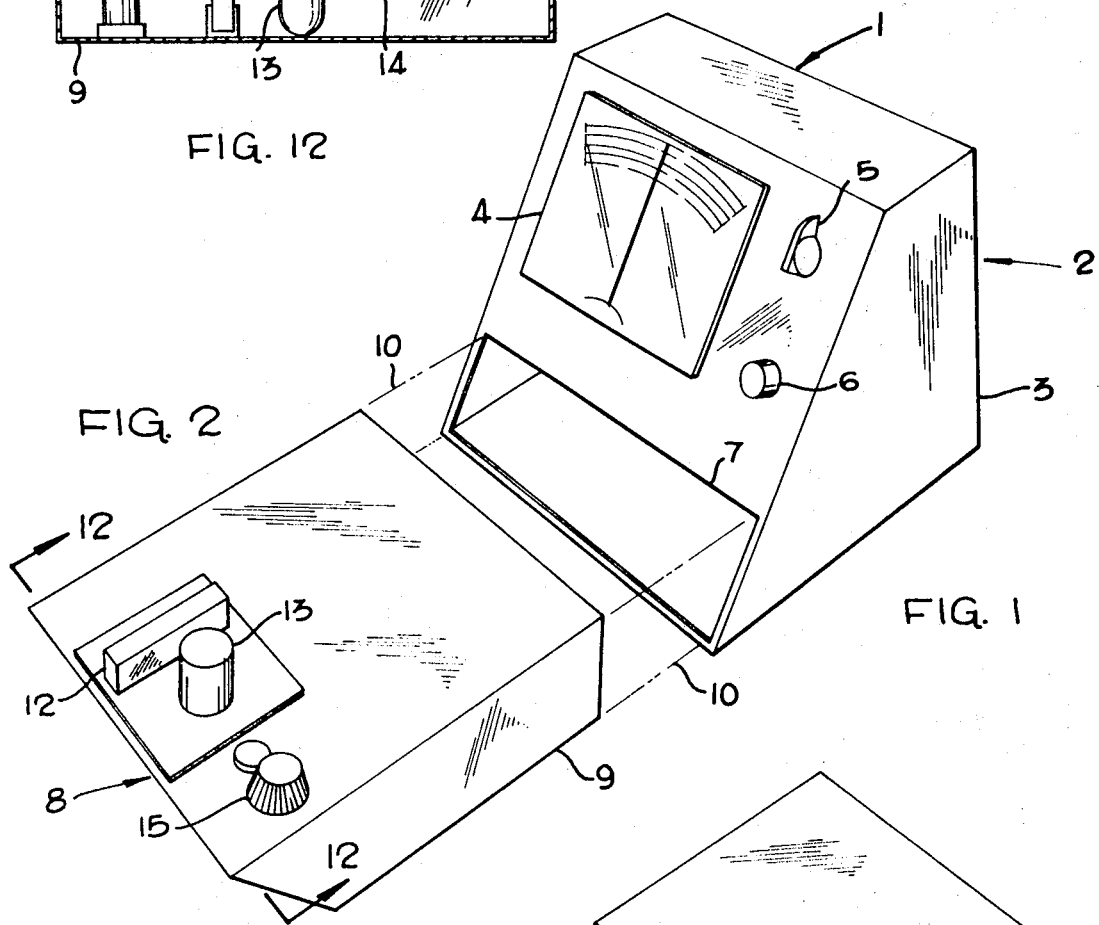
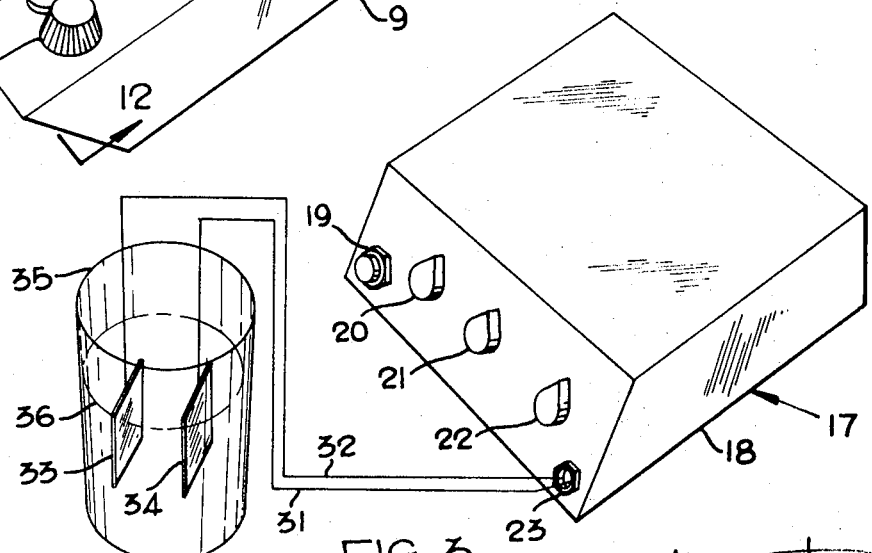
Inventor
WARREN G. KINNINGER
By Roger M. Hibbits
Attorney Inventor
WARREN G. KINNINGER
By Roger M. Hibbit
Attorney

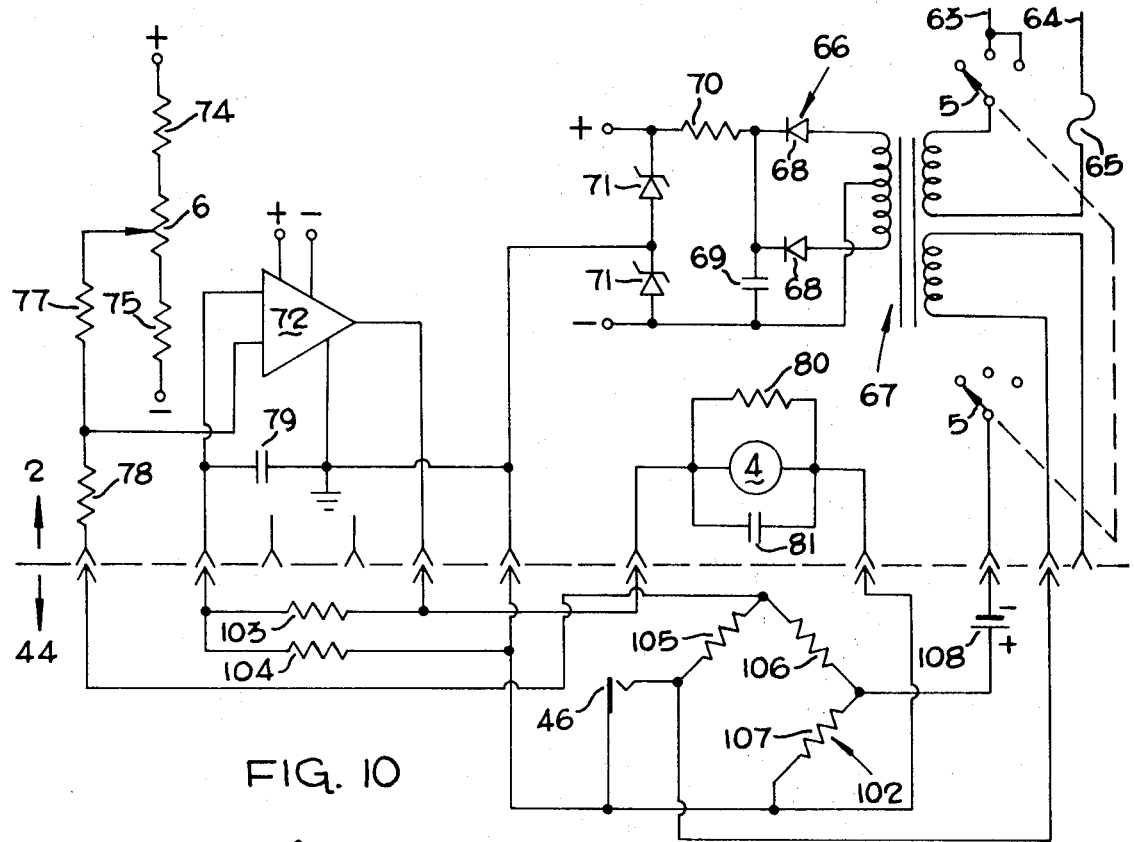
FIG. 10
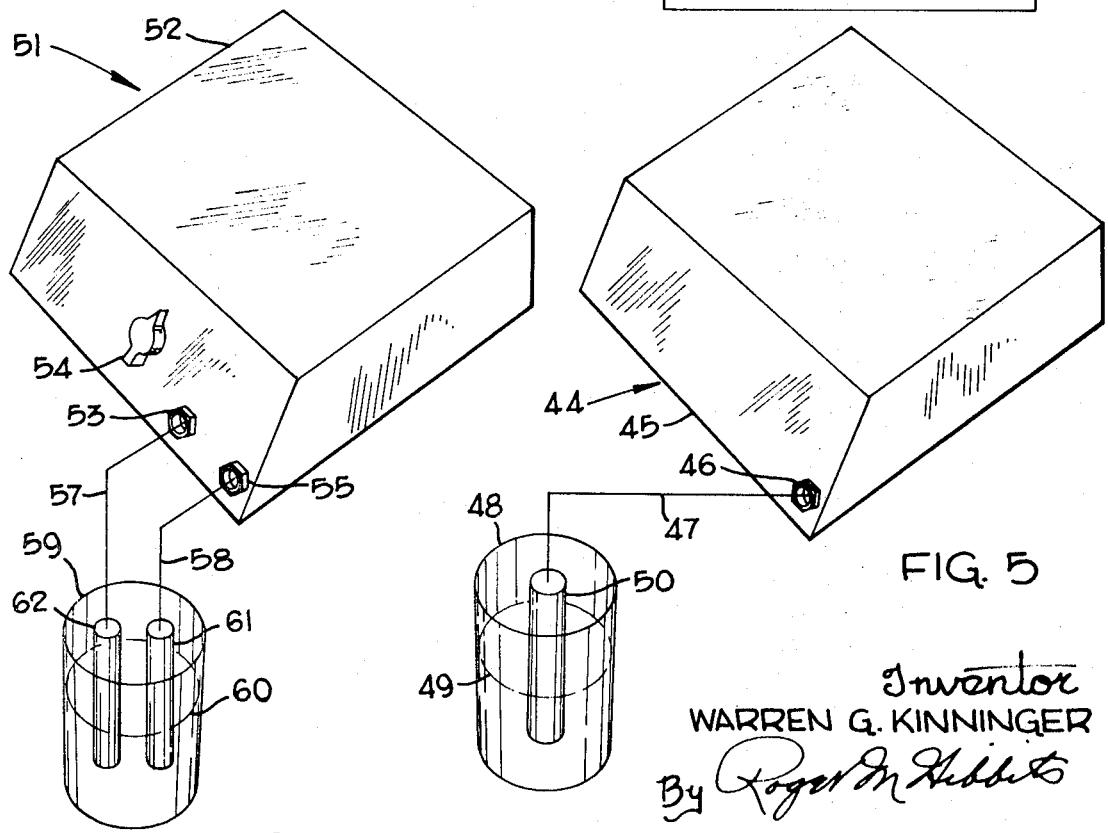
FIG. 6
FIG. 5
Inventor
WARREN G. KINNINGER
By Roger M. Hibbits
Attorney Inventor
WARREN G. KINNINGER 3,619,776

MULTIFUNCTION INSTRUMENT INCLUDING PLUG-IN MODULES HAVING AMPLIFIER RESPONSE CONTROL ELEMENTS

BACKGROUND OF THE INVENTION

Scientists, scientific investigators and science teachers are constantly seeking instruments which will perform measurements and serve as demonstration tools in a manner which is simple, versatile and economical.

Instruments for the measurement of quantities contemplated by the present invention normally contain the entirety of the elements necessary for a complete instrument or meter. In the field of use contemplated by the present invention instruments or meters presently available, with minor exceptions, are each provided with elements such as electrical power supply for converting conventional household AC voltage to a DC voltage, amplifier, and meters as well as elements associated with the measurement of a specific quantity. Therefore, when several quantities are to be measured, a plurality of instruments are required with an attendant redundancy of elements common to the several instruments with its obvious drawbacks.

Multifunction instruments or meters which have been used in the past have evolved in fields of use where the functions combined into instrument are primarily dependent functions, such as meters which are provided with the capability to measure voltage, current and resistance.

Instruments or meters which have attempted to include a capablitity for multifunction purpose using removable mountable modules, or plug-in type modules, have been restricted to those applications or instruments wherein the module is an independent element in and of itself. An example of this might be the conventional Q-Meter which is normally provided with the capability of utilizing separate, independent inductors or capacitors.

In the field of use contemplated by the present invention it is desirable and essential that such an instrument be simply constructed in order to arrive at an instrument which is economically useful for the intended uses and yet be capable of measurement of such independent quantities as conductivity, oxygen uptake or evolution, temperature, pH and colorimetry.

SUMMARY OF THE INVENTION

The present invention contemplates utilizing a common unit which is provided primarily with elements which are normally common to all meters or instruments use for the measurement of quantities contemplated, in conjunction with function modules removably mountable to said common unit, wherein the function modules are constructed so as to be dependent and independent of the common unit and thereby eliminate the redundancy normally associated with prior art devices.

It is therefore an object of the present invention to provide a multifunction instrument, the function of which may be modified by simply changing removably mounted modules.

Another object of the present invention is to provide such a device which is simple and economical to manufacture, sell and use.

A further object of the present invention is to provide such a device which capable of measuring quantities which are independent.

A further object of the present invention is to provide such a device wherein the common unit and function modules are simultaneously functionally independent and dependent.

A further object of the present invention is to provide such a device wherein the common unit automatically adjusts to the reception of different function modules.

The above-mentioned and further objects, advantages and features of my invention will be apparent from, and will be set forth in the following with reference to the drawings showing embodiments of the invention by way of example.

BRIEF DESCRIPTION OF THE DRAWINGS

In the drawings:

FIG. 1 is a perspective view of a common unit constructed in accordance with and embodying the present invention.

FIG. 2 is a perspective view of a colorimeter functional module constructed in accordance with and embodying the present invention.

FIG. 3 is a perspective view of a conductivity functional module constructed in accordance with and embodying the present invention.

FIG. 5 is a perspective view of a temperature functional module constructed in accordance with and embodying the present invention FIG. 6 is a perspective view of a pH functional module constructed in accordance with and embodying the present invention.

FIG. 10 is an electric circuit diagram showing the electrical components of the common unit and the temperature functional module constructed and connected in accordance with and embodying the present invention.

FIG. 12 is a sectional perspective view of the colorimeter module shown in FIG. 2.

DETAILED DESCRIPTION OF THE INVENTION

Referring now to the accompanying drawings in detail, FIG. 1 illustrates a structural embodiment of a common unit, 2, of instrument, 1, constructed in accordance with and embodying the present invention.

In FIG. 1, common unit, 2, is shown structurally comprising a cabinet, 3, with meter, 4, control switch, 5, and zero adjust potentiometer, 6, operably mounted thereon. Cabinet, 3, is provided with aperture, 7, which allows structural insertion, as indicated in FIG. 1 and FIG. 2, of function modules such as colorimeter module, 8. The electrical and electronic portion of common unit, 2, is mounted within cabinet, 3, which includes suitable complementary connector means to mater structurally and electrically with connector means mount on the function modules, and is shown schematically in FIGS. 7 through 11, and is described hereinafter.

In FIG. 2, and FIG. 12, colorimeter module, 8, is shown structurally as comprising cabinet, 9, with lamp, 11, filter, 12, cuvette, 13, photocell, 14, and potentiometer, 15, mounted thereto. Dotted lines, 10, illustrate the interface relationship between the front surface of cabinet, 3, and the walls of cabinet, 9, when colorimeter module, 8, is inserted in common unit, 2. The electrical and electronic portion of colorimeter module, 8, is mounted within cabinet, 9, and is shown schematically in FIG. 7, and is described hereinafter.

In FIG. 3, conductivity module, 17, shown structurally as comprising cabinet, 18, with button switch, 19, range switch, 20, potentiometer, 21, potentiometer, 22, and terminal, 23, mounted thereon.

Also shown in FIG. 3, is an experimental arrangement for the measurement of conductivity of a solution, 36, using the present invention. Solution, 36, is shown contained in beaker, 35. The conductivity of solution, 36, may be measured utilizing platinum plates, 33, and, 34, which are electrically coupled to the electrical and electronic elements contained in cabinet, 18, through conductors, 31, and, 32, by way of terminal, 23. The electrical and electronic portion of conductivity module, 17, is mounted within cabinet, 18, and is shown schematically in FIG. 8, and is described hereinafter.

Figure 4:
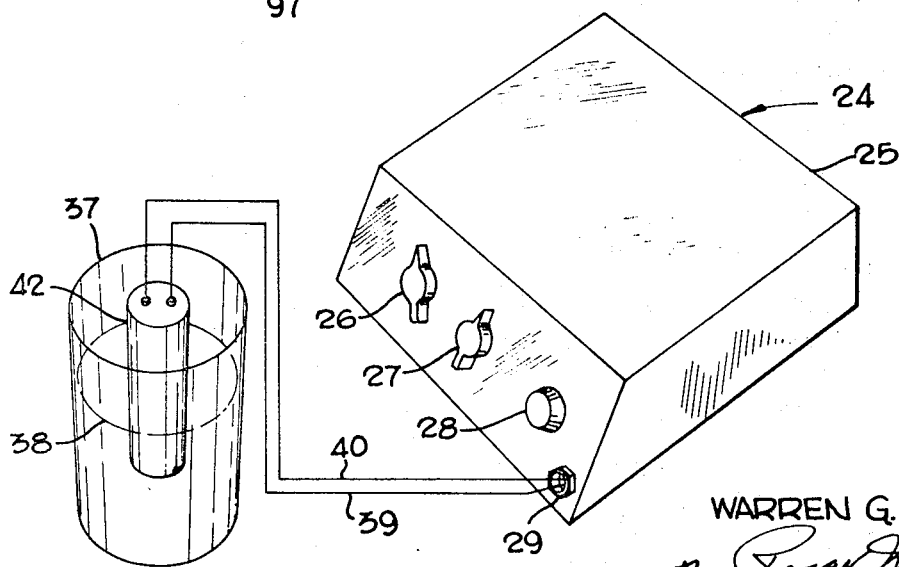
FIG. 4 is a perspective view of a oxygen functional module constructed in accordance with and embodying the present invention.

In FIG. 4, oxygen module, 24, is shown structurally as comprising cabinet, 25, with potentiometer, 26, switch, 27, potentiometer, 28, and terminal, 29, mounted thereon.

Also shown in FIG. 4, is an experimental arrangement for the measurement of oxygen evolution or uptake of solution, 38, relative to an oxygen-saturated distilled water solution using the present invention. Solution, 38, is shown contained in beaker, 37. Percentage of oxygen in solution, 38, may be measured utilizing a conventional probe, 42, described in further detail hereinafter. Probe, 42, is electrically coupled to the electrical and electronic elements contained in cabinet, 25, through conductors, 39, and, 40, by way of terminal, 29. The electrical and electronic portion of oxygen module, 24, is mounted within cabinet, 25, and is shown schematically in FIG. 9, and is described hereinafter.

In FIG. 5, temperature module, 44, is shown structurally as comprising cabinet, 45, with terminal, 46, mounted thereon.

Also shown in FIG. 5, is an experimental arrangement for the measurement of the temperature of solution, 49, using the present invention. Solution, 49, is shown contained in beaker, 48. The temperature of solution, 49, may be measured utilizing thermistor probe, 50, which is electrically coupled to the electrical and electronic elements contained in cabinet, 45, through cable, 47, by way of terminal, 46. The electrical and electronic portion of temperature module, 44, is mounted within cabinet, 45, and is shown schematically in FIG. 10, and is described hereinafter.

In FIG. 6, pH module [hydrogen ion module], 51, is shown structurally as comprising cabinet, 52, with terminal, 53, potentiometer, 54, and terminal, 55, mounted thereon.

Also shown in FIG. 6 is an experimental arrangement for the measurement of percent hydrogen in solution, 60, using the present invention. Solution, 60, is shown contained in beaker, 59. The percent hydrogen in solution, 60, may be measured utilizing electrodes, 61, and, 62, which are electrically coupled to the electrical and electronic elements contained in cabinet, 52, through conductors, 57, and, 58, by means of terminals, 53, and, 55. The electrical and electronic portion of pH module, 51, is mounted within cabinet, 52, and is shown schematically in FIG. 11, and is described hereinafter.

Figure 7:
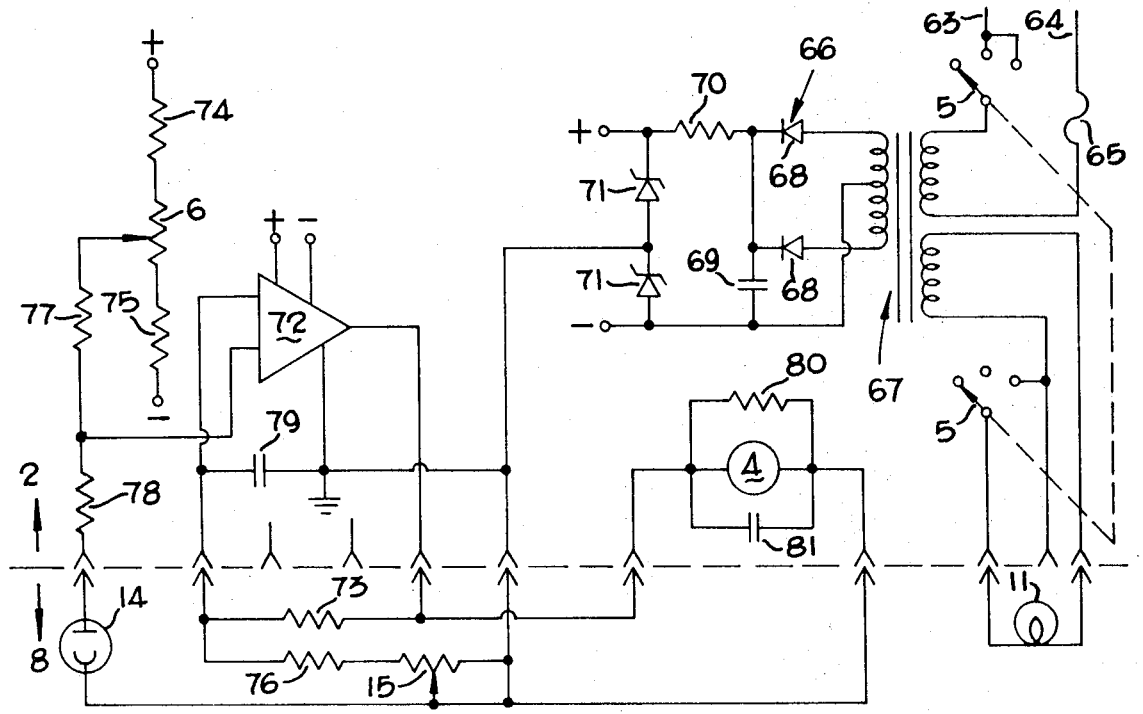
FIG. 7 is an electric circuit diagram showing the electrical components of the common unit and the colorimeter functional module constructed and connected in accordance with and embodying the present invention.

FIG. 7, illustrates schematically the electrical and electronic elements and interconnections of and between common unit, 2, and colorimeter module, 8.

Electrical power to instrument, 1, is assumed to be conventional household 115 volts, AC voltage by means of conductors, 63, and, 64. Power to the instrument is controlled by control switch, 5, which may be a conventional double-pole, triple throw switch, which is inserted electrically in series in conductor, 63. In series with conductor, 64, is fuse, 65, to protect the elements of the instrument, 1. The AC supply voltage is converted by full-waver rectifier, 66, comprising transformer, 67, diodes, 68, capacitor, 69, resistor, 70, and zener diodes, 71. The output of the full wave rectifier, 66, is nominally +15 volts DC and −15 volts DC. Transformer, 67, also supplies power to lamp, 11.

Amplifier, 72, which may be a commercially available amplifier is powered by the +15 volts DC and −15 volts DC volts outputs of full wave rectifier, 66. Feedback resistor, 73, is contained in colorimeter module, 8. Zeroing of amplifier, 72, is provided by a conventional voltage divider comprising resistors, 74, and, 75, in series with zero adjust potentiometer ,6, and resistor, 77. Voltage signals from photocell, 14, caused by light impinging on photocell, 14, are conducted to amplifier, 72, through resistor, 78, where they are amplified and then measured by meter, 4, connected across the output of amplifier, 72.

Referring now to FIGS. 1, 2, and, 7, the following experiment using the instrument, 1, will more clearly describe the interrelationship of the elements of common unit, 2, and colorimeter module, 8. Electrical power to instrument, 1, is turned on using control switch, 5, which thereby powers lamp, 11. To measure the transmissibility of a particular solution to light of a particular wavelength relative to the transmissibility of distilled water to light of such a wavelength, a suitable filter, 12, is selected which will pass light of the desired wavelength from lamp, 11, to cuvette, 13. Cuvette, 13, is then filled with distilled water. Light of the desired wavelength passes through filter, 12, and then through the distilled water in cuvette, 13, and impinges on photocell, 14, which causes a voltage indication on meter, 4. Potentiometer, 15, is then adjusted so that meter, 4, indicates full scale or 100 percent for the given conditions. A sample solution is then substituted for the distilled water in cuvette, 13. Meter, 4, will then indicate the relative transmissibility of the sample solution to light of the selected wavelength.

Capacitor, 79, is provided as a bypass capacitor for the input of amplifier, 72. Resistor, 80, and capacitor, 81, establish an appropriate time constant, or filter, for meter, 4.

Figure 8:
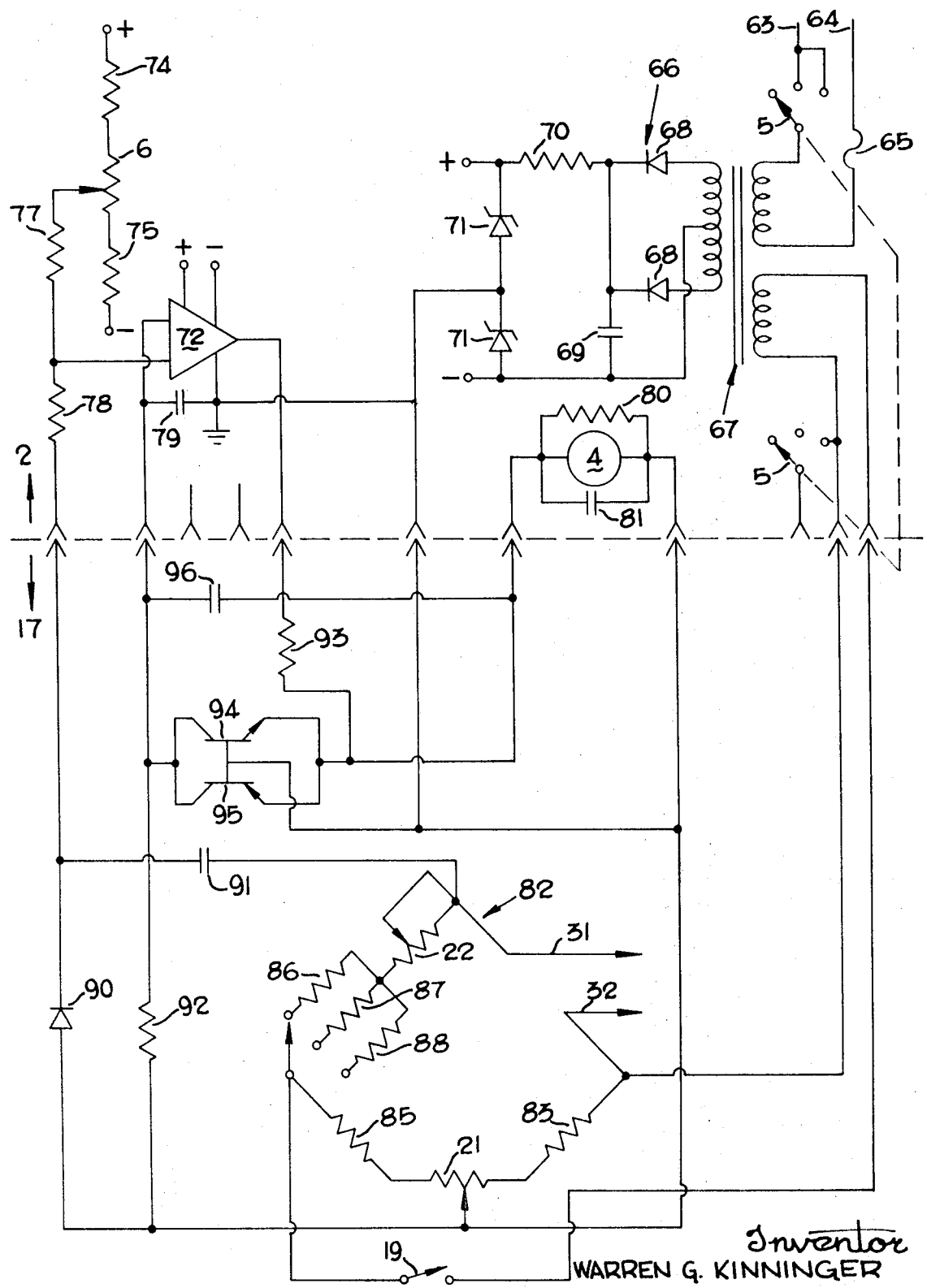
FIG. 8 is an electric circuit diagram showing the electrical components of the common unit and the conductivity functional module constructed and connected in accordance with and embodying the present invention.

FIG. 8, illustrates schematically the electrical and electronic elements and interconnections of and between common unit, 2, and conductivity module, 17.

Electrical power to instrument, 1, is provided and controlled in same manner as shown in FIG. 7 and above described. The winding of transformer, 67, which powered lamp, 11, in FIG. 7, now provides AC power to bridge, 82. Bridge, 82, comprises resistor, 83, potentiometer, 21, resistor, 85, range resistors, 86, 87, and, 88, potentiometer, 22, and solution, 36. The input voltage to bridge, 82, is an AC voltage. The output AC voltage of bridge, 82, is taken from the wiper arms of potentiometers, 21, and, 22, and connected across diode, 90, through coupling capacitor, 91, for rectification. The DC voltage across diode, 90, is coupled through resistor, 78, to the input of amplifier, 72. In the configuration shown in FIG. 8, amplifier, 72, and meter, 4, act as a null detector to determine when bridge, 82, is balanced.

Switch, 19, is used to control power to bridge, 82. Resistors, 92, and, 93, and transistors, 94, and, 95, and capacitor, 96, are provided to give amplifier, 72, a logarithmic response for greater sensitivity at null voltages.

Figure 9:
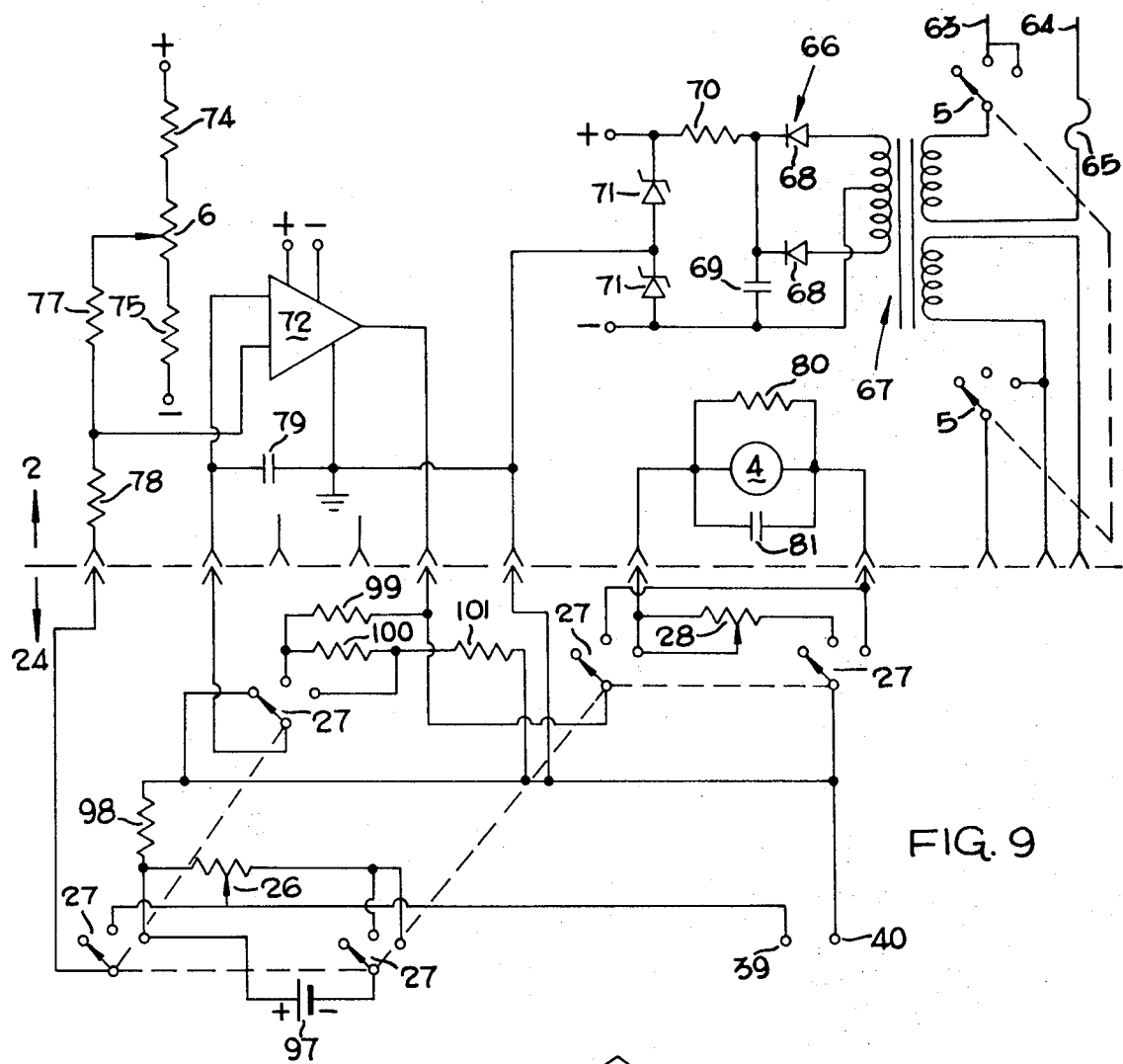
FIG. 9 is an electric circuit diagram showing the electrical components of the common unit and the oxygen functional module constructed and connected in accordance with and embodying the present invention.

In FIG. 9 the electrical connections and interconnections between the common unit, 2, and oxygen module, 24, are shown. As shown in FIG. 9, oxygen module, 24, is provided with battery, 97, which provides the current necessary for the experiment or measurement, potentiometer, 28, which is connected in series with meter, 4, and adjusts the full scale reading of said meter [100 percent saturation], potentiometer, 26, which provides adjustment of the potential supplied by battery, 97, to probe, 42, via conductors, 39, and, 40, resistors, 99, 100, and, 101, which are alternately inserted in the feedback path around amplifier, 72, and thereby provide alternate gains through amplifier, 72.

In the preferred embodiment of the invention, probe, 42, may be a commercially available probe such as the "Clark Electrode." This type of probe is provided with a silver anode and platinum cathode imbedded in a plastic rod with the ends of said wires being exposed at a first end of said rod and the other end of said wires adapted for connections to external electrical conductors such as conductors, 39, and, 40, shown in FIG. 4. Disposed about the second end of said plastic rod is a suitable plastic membrane which is permeable to oxygen. Disposed between the end of said rod and said membrane, is a saturated KCL solution. In the intended use of the present invention probe, 42, is placed in a beaker of distilled water, which is used as a standard. The correct probe potential is then adjusted using potentiometer, 26, while reading meter, 4.

Normally the polarization or probe potential should be 0.8 volt. Oxygen is then bubbled through the distilled water until a stable reading is obtained on meter, 4, at which point potentiometer, 28, is adjusted so that the meter, 4, reads full scale or 100 percent saturation. Thereafter, bubbling nitrogen through solution, 38, removes all oxygen therefrom and a zero reading is indicated on meter, 4. Instrument, 1, is now prepared for measurement of percent dissolved oxygen in solutions such as stream water with respect to saturated distilled water or by placing yeast in a solution and placing the probe in the solution the reduction of oxygen in the solution caused by intake of the yeast may be measured with meter, 4.

Switch, 27, a 5-pole triple throw switch is provided to obtain an off condition wherein battery, 97, is disconnected from other circuitry. A test position of switch, 27, is provided wherein common unit, 2, is connected as a voltmeter to measure the output of amplifier, 72, and a Read position wherein the meter polarity is reversed and common unit, 2, or meter, 4, is now connected as a voltmeter to measure smaller voltages which are developed by currents through probe, 42. Switch, 27, also controls which of resistors, 99, 100, and, 101, is inserted in the feedback path of amplifier, 72, and thereby determine its gain. It should be noted that common unit, 2, may be power on while switch, 27, is in an off position thus amplifier, 72, is energized. In the test position of switch, 27, instrument, 1, measures the polarization voltage applied to probe, 42, while in the Read position instrument, 1, measures the voltage across a resistor internal to probe, 42, developed by current through said probe.

In FIG. 10 the electrical connections and interconnections between common unit, 2, and temperature module, 44. As shown in FIG. 10, temperature module, 44, is provided with resistor, 103, which is connected in the feedback path of amplifier, 72, and thereby determines its gain in combination with resistor, 104, at the input of amplifier, 72, resistors, 105, 106, and, 107, which in conjunction with thermistor probe, 50, provide the resistive elements for a conventional wheatstone bridge, 102. Control switch, 5, in common unit, 2, is provided to close the path between battery, 108, and said bridge and thereby battery, 108, provides the necessary energization of said bridge. Meter, 4, is provided with a degree centigrade scale to read temperature of probe, 50, directly.

In operation, as the temperature of thermistor probe, 50, varies, the resistance presented by said probe to the aforesaid bridge varies and an unbalance of the bridge occurs which causes an output signal to be provided to the input of amplifier, 72, via resistor, 78.

Figure 11:
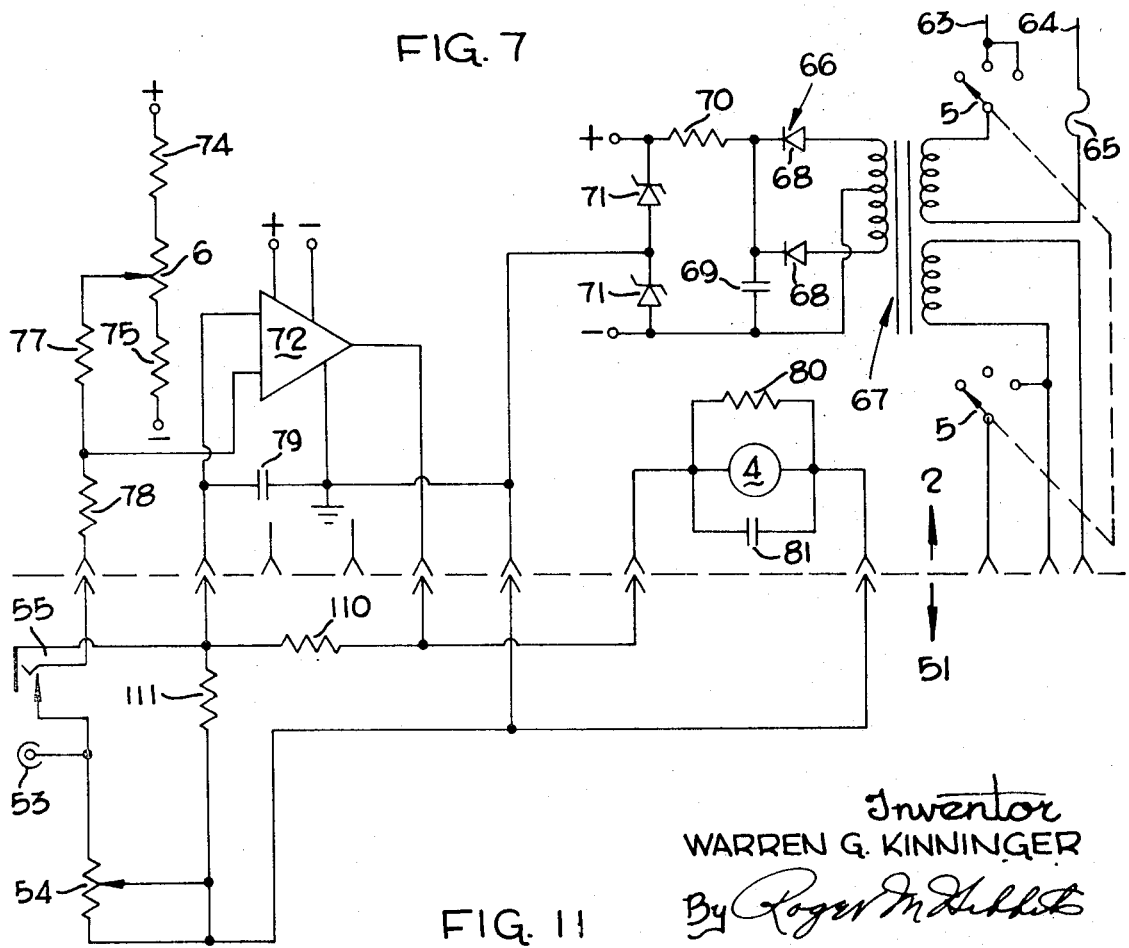
FIG. 11 is an electric circuit diagram showing the electrical components of the common unit and the pH functional module constructed and connected in accordance with and embodying the present invention.

In FIG. 11 the electrical connection and interconnections of and between common unit, 2, and pH module, 51, are shown. pH module, 51, is provided with resistor, 110, which is inserted in the feedback path of amplifier, 72, and thereby in conjunction with resistor, 111, determines the gain of amplifier, 72. Calibration resistor, 53, and temperature adjust potentiometer, 54.

Terminal, 53, and, 55, provide for conducting electrical signals from experimental electrodes, 61, and 62, to the input of amplifier, 72, and potentiometer, 54.

pH may be measured indirectly by measuring the voltage developed by a cell consisting of a "glass electrode," 61, and a reference "calomel electrode," 62. The "glass electrode," 61, consists of a silver chloride electrode in contact with a hydrogen chloride solution of known hydrogen chloride solution are encased in a special membrane such as glass which is permeable to hydrogen ions but not to other ions. The "calomel electrode," 62, is independent of hydrogen ions. Thus, when the "glass electrode," 61, and "calomel electrode," 62, are disposed within solution, a potential develops between the two electrodes which is indicative of the pH.

As shown in FIG. 11 terminal, 53, is connected by suitable conductor, 57, to the calomel electrode, 62.

It should be understood that changes and modifications in the form, construction, arrangement, and combination of the elements of the multifunction instrument and methods of making and using the same may be made and substituted for those herein shown and described without departing from the nature and principle of my invention.

Having thus described my invention, what I claim and desire to secure by United States Letters Patent is:

1. A multifunction instrument for measurement of scientific phenomena and classroom demonstration of same, comprising
   a common unit having a mounting structure, said mounting structure adapted to mate structurally with function modules,
   said common unit provided with electric circuit components comprising,
   power supply means, said power supply means providing AC and opposite polarity DC voltages to power said circuit components,
   meter means, said meter means provided with a plurality of terminal means,
   response controllable amplifier means, said amplifier means provided with input and output terminals,
   amplifier zeroing means operably connected to an input terminal of said amplifier means,
   first electrical connector means operably and independently connected to the input terminals of said amplifier means, to the output terminals of said amplifier means, to said power supply means, to the terminals on said meter means, to switching means provided to control distribution of said power supply means, said first electrical connector means operably mounted on said common unit,
   function modules, adapted to structurally mate with said common unit, said function modules provided with second electrical connector means which electrically and mechanically mate with said first electrical connector means,
   said function modules provided with electric circuit components, said electric circuit components comprising,
   input circuit means,
   sensor means, said sensor means operably connected to said input circuit means,
   signal forming means operably connected to said input circuit means, said signal-forming means adapted to modify signals from said input circuit means and provide signals to said second electrical connector means,
   amplifier response control means operably connected to said second electrical connector means, said control means adapted to control the gain of said amplifier means,
   switching means operably connected to said electric circuit components, adapted to control power thereto.

* * * * *